(12) United States Patent
Hernandez

(10) Patent No.: US 8,708,382 B2
(45) Date of Patent: Apr. 29, 2014

(54) ELECTRICALLY ACTIVE HAND-OPERABLE EXCAVATION APPARATUS

(71) Applicant: Rigoberto Hernandez, North Palm Beach, FL (US)

(72) Inventor: Rigoberto Hernandez, North Palm Beach, FL (US)

(*) Notice: Subject to any disclaimer, the term of this patent is extended or adjusted under 35 U.S.C. 154(b) by 0 days.

(21) Appl. No.: 13/887,087

(22) Filed: May 3, 2013

(65) Prior Publication Data
US 2013/0313843 A1 Nov. 28, 2013

Related U.S. Application Data

(60) Provisional application No. 61/642,932, filed on May 4, 2012.

(51) Int. Cl.
*A01B 1/00* (2006.01)
(52) U.S. Cl.
USPC .................................. 294/49; 294/51; 294/59
(58) Field of Classification Search
CPC ........... A01B 1/02; A01B 47/00; A01D 11/04
USPC ................ 294/49, 51, 59, 174; 172/371–381; 37/265, 285, 241, 413, 434, 444, 903
See application file for complete search history.

(56) References Cited

U.S. PATENT DOCUMENTS

| 4,359,686 | A  | * | 11/1982 | Wherry ......................... 324/326 |
| 5,310,231 | A  | * | 5/1994  | Burkhart ......................... 294/59 |
| 7,575,065 | B1 | * | 8/2009  | Podhrasky ..................... 172/438 |
| 7,793,442 | B2 | * | 9/2010  | Koch et al. ....................... 37/413 |
| 7,797,861 | B2 | * | 9/2010  | Wright ............................. 37/443 |

FOREIGN PATENT DOCUMENTS

JP 61028640 A * 2/1986 ................ E02F 9/24

* cited by examiner

*Primary Examiner* — Saul Rodriguez
*Assistant Examiner* — Gabriela Puig
(74) *Attorney, Agent, or Firm* — McHale & Slavin, P.A.

(57) ABSTRACT

A hand-operable excavation apparatus for detecting buried electrical cable. The hand-operable excavation apparatus comprises of a unitary structure having a handle and an electrically conductive portion. At least one electric field sensor is secured to the electrically conductive portion to monitor electrical fields in proximity to the end of the device during ground breaking for activation of an alerting system when the preset value is greater than a predetermined voltage for notifying the excavator of buried electrical cable.

20 Claims, 6 Drawing Sheets

ELECTRICALLY ACTIVE HAND-OPERABLE EXCAVATION APPARATUS

REFERENCE TO RELATED APPLICATIONS

In accordance with 37 C.F.R. §1.76, a claim of priority is included in an Application Data Sheet filed concurrently herewith. Accordingly, the present invention claims priority under 35 U.S.C. §§119(e), 120, 121, and/or 365(c) to U.S. Provisional Patent Application No. 61/642,932, entitled "ELECTRICALLY ACTIVE HAND-OPERATED EXCAVATION APPARATUS", filed on May 4, 2012. The content of the above referenced application is incorporated herein by reference in its entirety.

FIELD OF THE INVENTION

This invention relates to a hand-operable tool, and more particularly to a hand operable excavation apparatus suited for detecting and alerting the user of buried electrical cables.

BACKGROUND OF THE INVENTION

A shovel is an excavation tool for digging, lifting, and moving bulk materials, such as soil, coal, gravel, snow, sand, or the like. Shovels are extremely common excavation tools that are used extensively in agriculture, construction, and gardening. Typically, a shovel is a hand operable unitary tool consisting of a broad blade made of metal, fixed to a handle of various lengths and types. Because shovels are typically constructed with an electrically conductive metal blade portion that breaks and lifts the ground surface, operation of a shovel poses several inherent risks, some of which are more obvious to the user than others. For example, an obvious risk associated with shovel use relates to the fact that the broad metal blade poses a serious risk of severing a finger or a portion of a foot. Other risks are not as obvious, such as the potential hazard of striking buried electrical cables during excavation. Underground electrical cables are easily mistaken for pipes or tree roots, and pose a hazard for the excavator.

A typical home may have numerous electrical, cable television and/or telephone lines buried underground which extend across the property. Some of these wires, such as cable television or telephone lines, carry very little electrical voltage, while others may carry a significant amount of electrical power. Unfortunately, it is impossible to distinguish between the two by simply observing the appearance of the wire. Currently, the only protection against digging into buried cables is to call the utility company or one of any number of other companies that come out to the digging site and mark where the buried cables are with paint or flags. This process, however, is not entirely accurate and cable placement is often mismarked or cables are missed entirely. Unfortunately, the person excavating is ultimately responsible for any damage caused to the cables during excavation. Whereby, cutting a phone cable may result in the excavator being charged not only with the repair cost of the cable, but also with lost revenue suffered by the utility company. By far the biggest danger results when the excavator severs a high voltage line which may result in serious injury or death.

Electric field detectors are known that detect the electric field strength relative to the user. The electric field detector senses electric field gradients at a distance and can detect energized objects without making direct contact. The electric field detectors are thereby useful for scanning large areas for potential buried electrical hazards. Thus, it is advantageous for an excavator to scan the area where ground breaking is to occur before excavation begins to prevent hazard or injury. However, in addition to the fact that most homeowners do not own electric field detectors, the field detectors do not indicate the precise location or depth of the buried cable. Whereby, a user of such a device would be required to repeatedly stop and check the digging site to determine if he was approaching a cable or diverging from the cable location. This shortcoming makes it unlikely that the excavator would use such a device even if he owned one. Thus, there is need for a hand-operable excavation apparatus, such as a shovel, that will detect stray voltage in proximity to the excavation site and alert the excavator of such to prevent the potential hazards associated with damaging the likes of buried electrical cables. The combination of the shovel and voltage detector should operate in a continuous mode so that each time the shovel is placed within the cavity the voltage detector would indicate to the operator whether he is approaching or diverging from a danger. The shovel should be purpose built to house the voltage detection device, or alternatively, the voltage detection device should be constructed to cooperate specifically with the shovel device.

SUMMARY OF THE INVENTION

This invention relates to a hand-operable tool, and more particularly to an electrically active excavation apparatus suited for detecting and alerting the user of buried cables that have an electrical charge flowing through the cable. More particularly, the present invention relates to a hand operated shovel that is provided in combination with an electric field detector for determining the proximity of the shovel to an electrical cable containing electricity. The hand-operable excavation apparatus generally includes an electrically conductive blade portion; the blade portion including a shank constructed for cooperation with an elongated handle to secure the blade and the handle securely together. The electrical field detector may be built into or attached along the length of the handle having a connection to the blade portion. The electrically-conductive blade portion is constructed and arranged for breaking and lifting ground material, such as a shovel blade; while the handle is constructed and arranged for applying the various forces to the blade portion that are necessary for breaking and lifting soil, rocks and the like. The voltage detector system produces a search field about the electrically-conductive shovel, senses the neutral to earth voltage gradient between the electrically-conductive portion and the ground, and determines if the neutral to earth voltage gradient is greater than a preset value. When the preset value is greater than a predetermined voltage an alerting system is activated, thereby notifying the excavator of buried electrical cable in proximity to the hand-operable excavation apparatus.

Accordingly, it is a primary objective of the present invention to provide an electrically active excavation apparatus in the form of a combination shovel and electric field detector, thereby creating a hand-operable excavation apparatus for detecting and alerting of buried electrical cable while breaking and lifting ground material.

It is another objective of the present invention to provide an electrically active excavation apparatus having an alert system that provides audible and/or visual notification to alert the user of the presence of an electric field within an area of excavation.

It is yet another objective of the present invention to provide an electrically active excavation apparatus including an alert system that increases in visual or audio notification as the electric field becomes stronger.

Finally, there are ergonomic needs that an electrically active excavation system must satisfy in order to achieve acceptance by the end user. The system must be easily and quickly assembled using minimal hardware and requiring a minimal number of tools. Further, the system should not require excessive strength to assemble or include heavy component parts. Moreover, the system must assemble together in such a way so as not to detract from the aesthetic appearance of the electrically active excavation apparatus.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
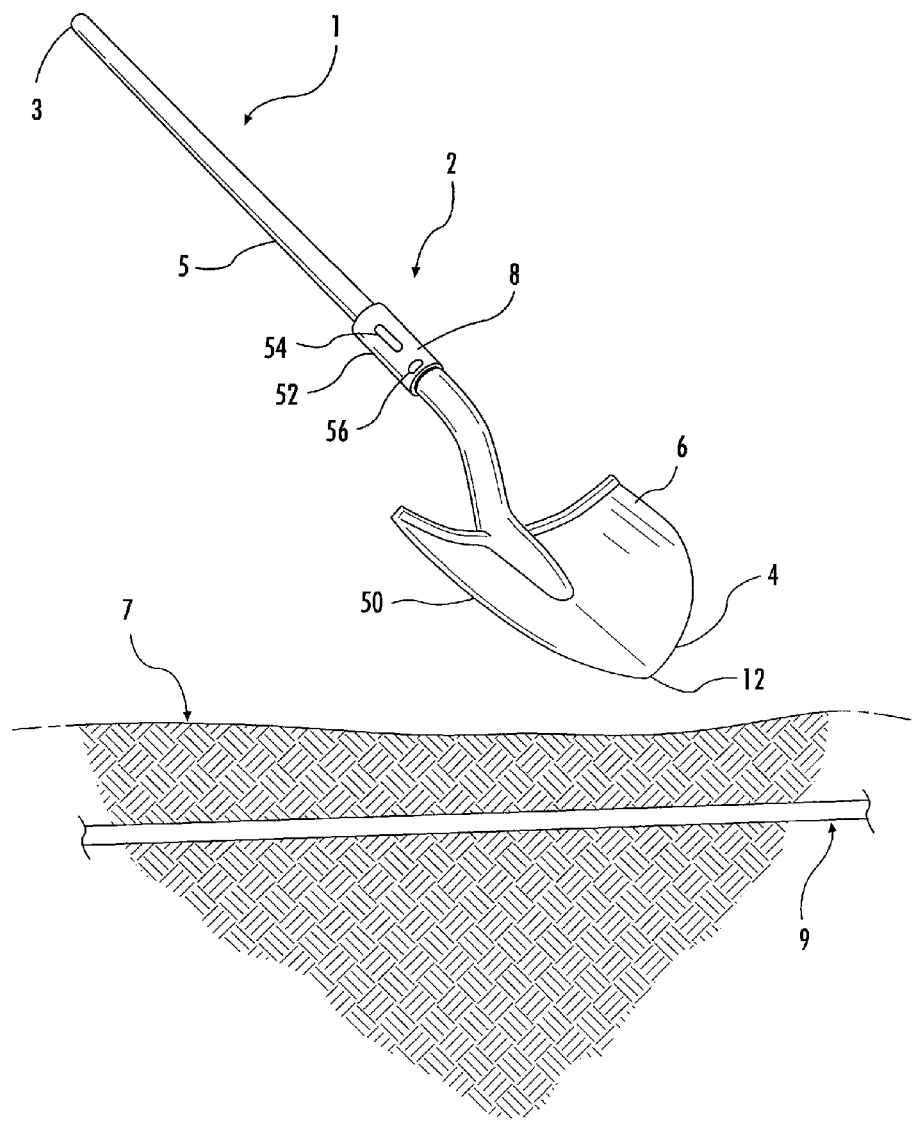
FIG. 1 is a perspective view of one embodiment of the electrically active excavation apparatus of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 2:
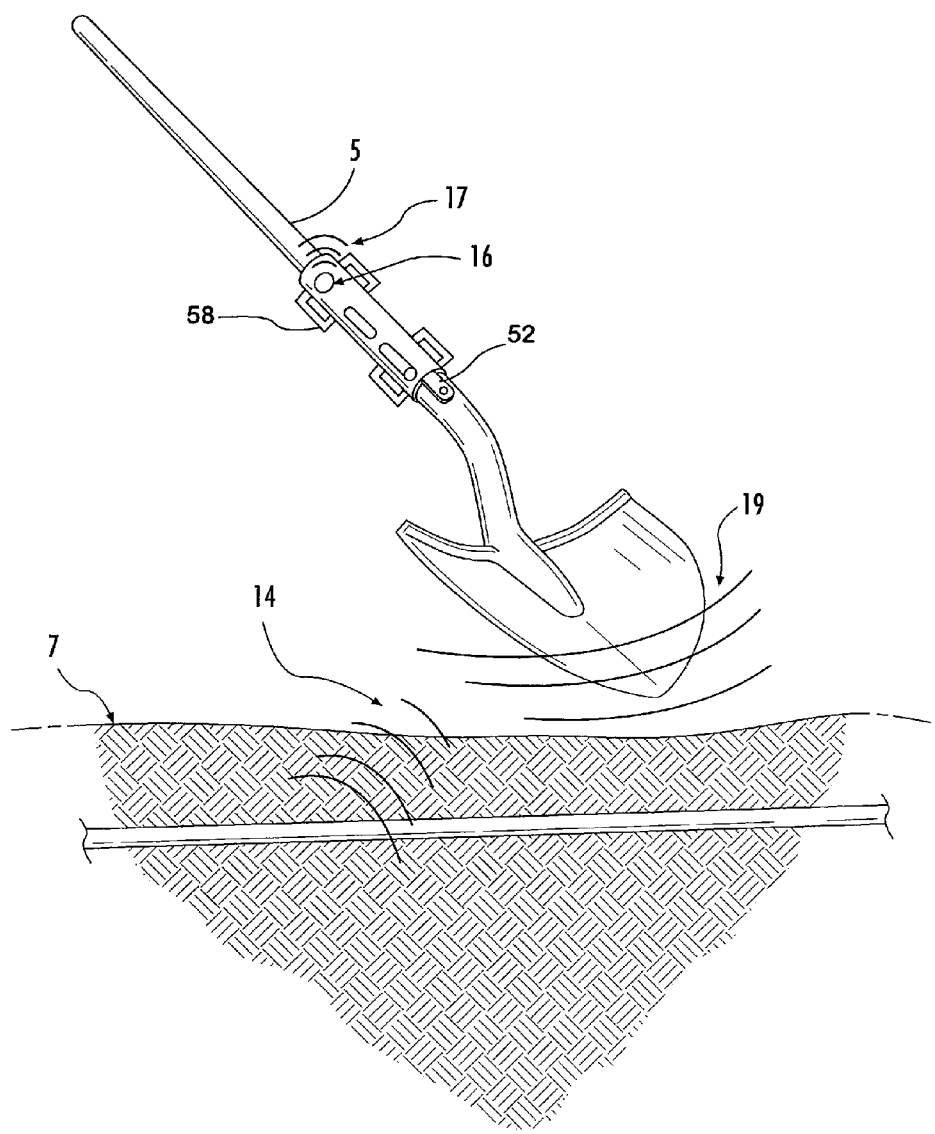
FIG. 2 is a perspective view of an alternative embodiment of the electrically active excavation apparatus of the present invention.

Referring to FIGS. 1 and 2, perspective views of one embodiment of the electrically active excavation apparatus 1 are illustrated. In general, the electrically active excavation apparatus is constructed as a unitary device 2 having a first end 3 and a second end 4, the first end 3 being a handle 5 and the second end 4 having an electrically conductive portion 6. The handle 5 may be constructed of a conductive or non-conductive material. In the preferred embodiment, the handle 5 is constructed of a non-conductive material such as fiberglass to act as an insulator should the hand-operable excavation apparatus 1 strike a live electrical cable 9. The electrically conductive portion 6 is constructed and arranged for breaking and lifting ground material 7. In the preferred embodiment, the electrically conductive portion 6 is a metal shovel having a broad blade 50. In the preferred embodiment, the electrically conductive blade 50 is constructed of, but not limited to, a metal such as steel. However, it should be noted that any other material suitably conductive to transfer the electrical field signal may be utilized without departing from the scope of the invention. The shovel may be constructed to have any geometrical shape desired on the second end point 12 to help facilitate the breaking and lifting of the ground material 7 in a desired manner. In a most preferred embodiment, the shovel has a sharpened end point for easy breaking and lifting of the ground surface.

In the preferred embodiment, the field detector system 8 is integrally formed into the lower portion of the handle 52 so that it is in electrical communication with the electrically conductive portion 6. In this manner, the field detector maintains a low profile by having at least a portion of the electronics required for field detection positioned within the handle. Light-emitting diode (LED) light indicators 54 and sound generating systems 56 may be visible on the outer surface of the handle to give the user a visual and audible alarm upon the detection of an electromagnetic field. Vibrators (not shown) or other devices suitable for giving the operator a tactile feedback may also be included. Field detectors, sometimes referred to as EMF detectors, are known in the electrical arts as devices that measure electromagnetic fields by measuring electromagnetic flux density (DC fields) or change in electromagnetic fields over time (AC fields). In addition, field detectors may be single axis or tri-axis, which are capable of measuring the field strength in three axes simultaneously. In this manner, directionality as well as distance to the electrical cable may be provided to the user.

Figure 3:
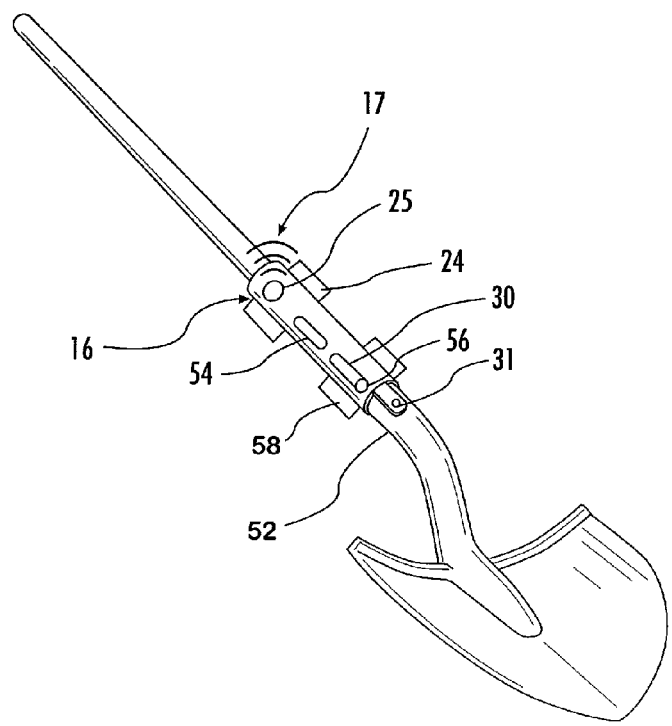
FIG. 3 is a perspective view of an alternative embodiment of the electrically active excavation apparatus of the present invention.
Figure 4:
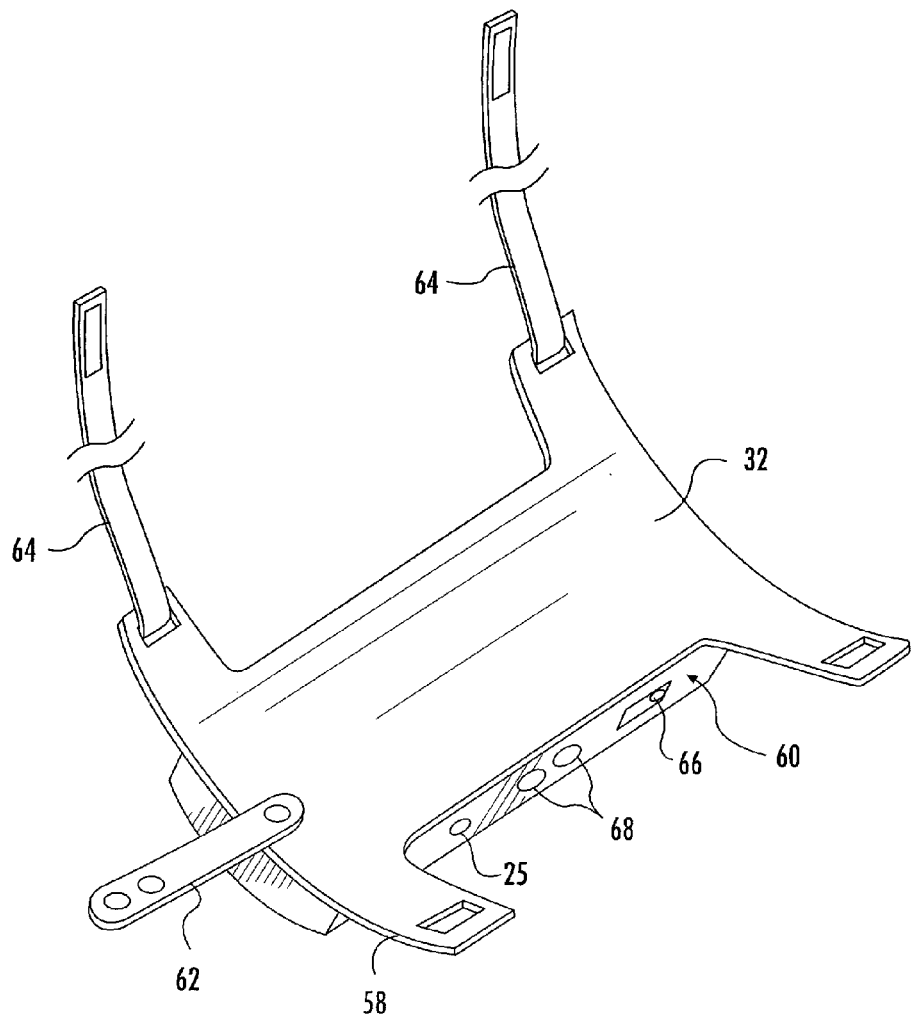
FIG. 4 is a rear view of the field detector system.

Referring to FIGS. 2-4, front and rear views of an alternative embodiment of the field detector system, or FDS 8 are illustrated. In this embodiment, the FDS is constructed as a kit or separate device constructed and arranged to be mounted upon the handle portion 5 of a pre-existing shovel or tool 1. In the preferred embodiment, the back side 32 is contoured to better fit the shape of the handle portion of the unitary device 2. Tabs 58 may extend outwardly from the housing 60 for cooperation with hook and loop straps 64, a stretchable neoprene sleeve, zip-ties, screws, adhesive, double sided tape or suitable combinations thereof for use to mount the field detector system 8 onto the unitary device 2. The housing is also constructed and arranged to house a power supply in the form of batteries 30, and an alert mechanism that may be in the form of one or more lights 54 and/or an audible signal. The lights are preferably LEDs, while the audible is preferably a piezo or small speaker 56. An electrically conductive plate 62 extends outwardly from the housing 60 while including apertures for connection to the electrically conductive blade 6. In operation, the FDS is electrically configured to produce a search field 19 about the electrically conductive portion 6; whereby, the neutral to earth voltage gradient 14 between the electrically conductive portion 6 and the ground 7, and the field detector system 8 determines if the neutral to earth voltage gradient 14 is greater than a preset value. If the neutral to earth voltage gradient 14 is greater than the preset value, then the field detector system 8 activates the visual and/or audible alert system 16; whereby, the audible or visual alert 17 gets incrementally stronger, lighting more LEDs or increasing volume or pitch of the audible signal, based on an increase on the preset value for the neutral to earth voltage gradient 14. Likewise, when the tactile feedback is utilized, vibration intensity or frequency can be altered to provide indication to the user of an approximation to the cable. When the neutral to earth voltage gradient 14 is below the preset value, the alert system 16 is not triggered and remains silent. In at least one embodiment, the neutral to earth voltage gradient 14 preset value is about 2 volts. However, it should be noted that preset values less than or greater than 2 volts may be utilized without departing from the scope of the invention. At less than 2 volts, the field detector system 8 becomes very sensitive to buried electrical cables 9. The field detector system 8 may also include a circuit breaker switch 25 to protect the field detector circuitry 24 and to reset the device in the event it receives an overvoltage. An on-off switch 66 may also be provided to extend the life of the battery circuit. In addition, a test circuit may be provided to allow the operator to touch a pair of contacts 68 to test for proper operation of the field detector prior to use of the tool. In operation, the operator would utilize one or two fingers to touch a pair of contacts 68 to indicate an electrical field to the field detector. This should cause the visual and/or audible alarms to operate indicating proper operation of the device. Proper operation would cause the LEDs to light and the audible signal to be emitted. In the event neither alarm signal is returned, the operator would know the device was non-functional for one of various reasons and thus it should not be relied upon to indicate proximity to a field.

Figure 5:
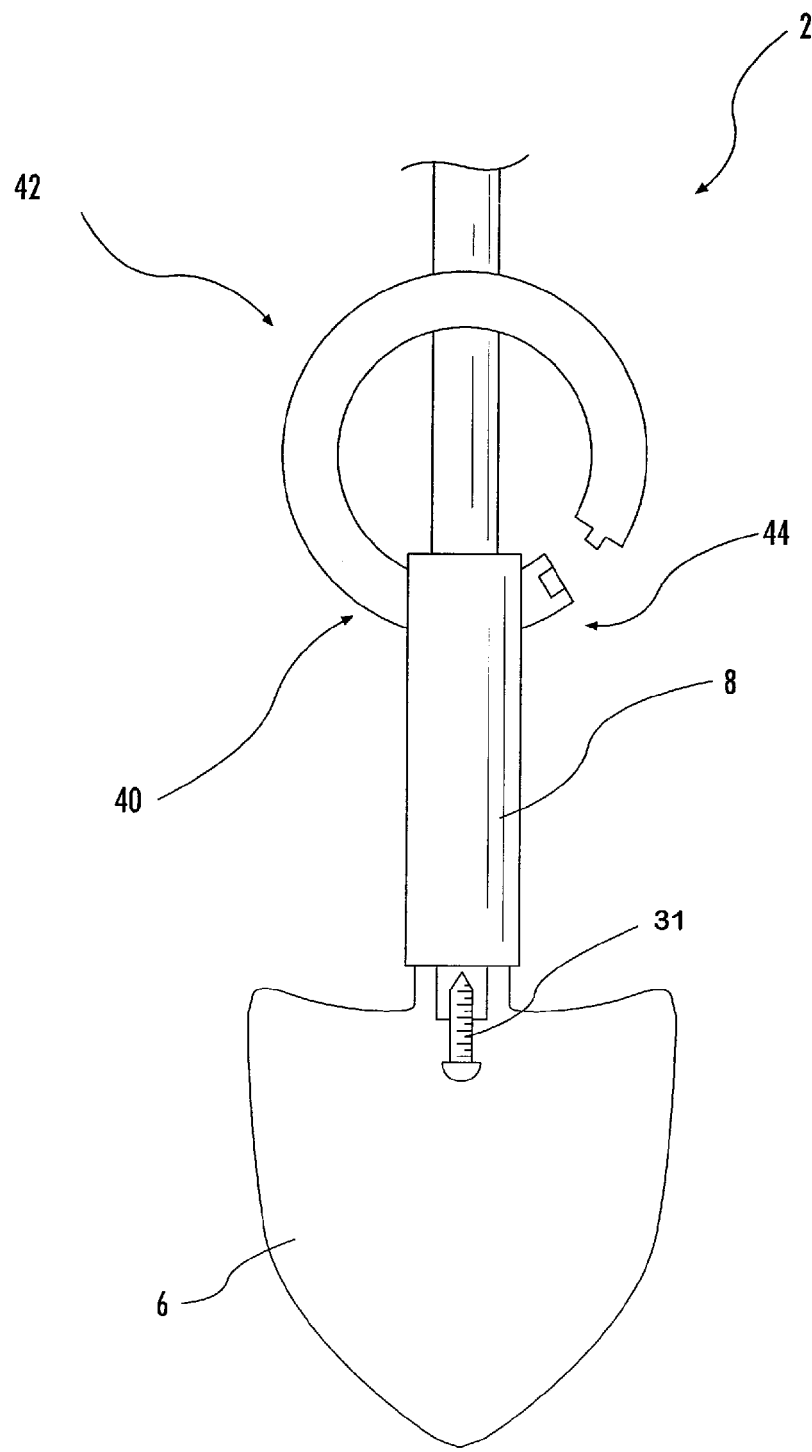
FIG. 5 is a pictorial representation of an alternative embodiment of the electrically active excavation apparatus.

Referring to FIG. 5, an alternative embodiment of the field detector system 8 is illustrated. In this embodiment, the field detector system 8 includes a latching mechanism 40, see FIG. 5. The latching mechanism 40 is contemplated as any mechanical fastener that allows the joining of the field detector system 8 and a unitary device 2. The latching mechanism 40 also allows for the regular separation of the field detector system 8 and the unitary device 2. The latching mechanism 40 will include a latch 42 and a mounting surface 44; they are spaced apart on opposite sides of the field detector system 8, whereby the latch 42 engages to the mounting surface 44 to connect the field detector system 8 and a unitary device 2. In this embodiment, a screw 31 or the like secured to the conductive plate 62 is positioned nearest the electrically conductive portion 6 of the unitary device 2, whereby the screw 31 can be pressed/screwed against the electrically conductive portion 6 to maintain electrical communication between the voltage detector system 8 and the electrically conductive portion 6. In this manner, the field detector system can be easily attached to pre-existing shovels and the like without modification or permanent mounting.

Figure 6:
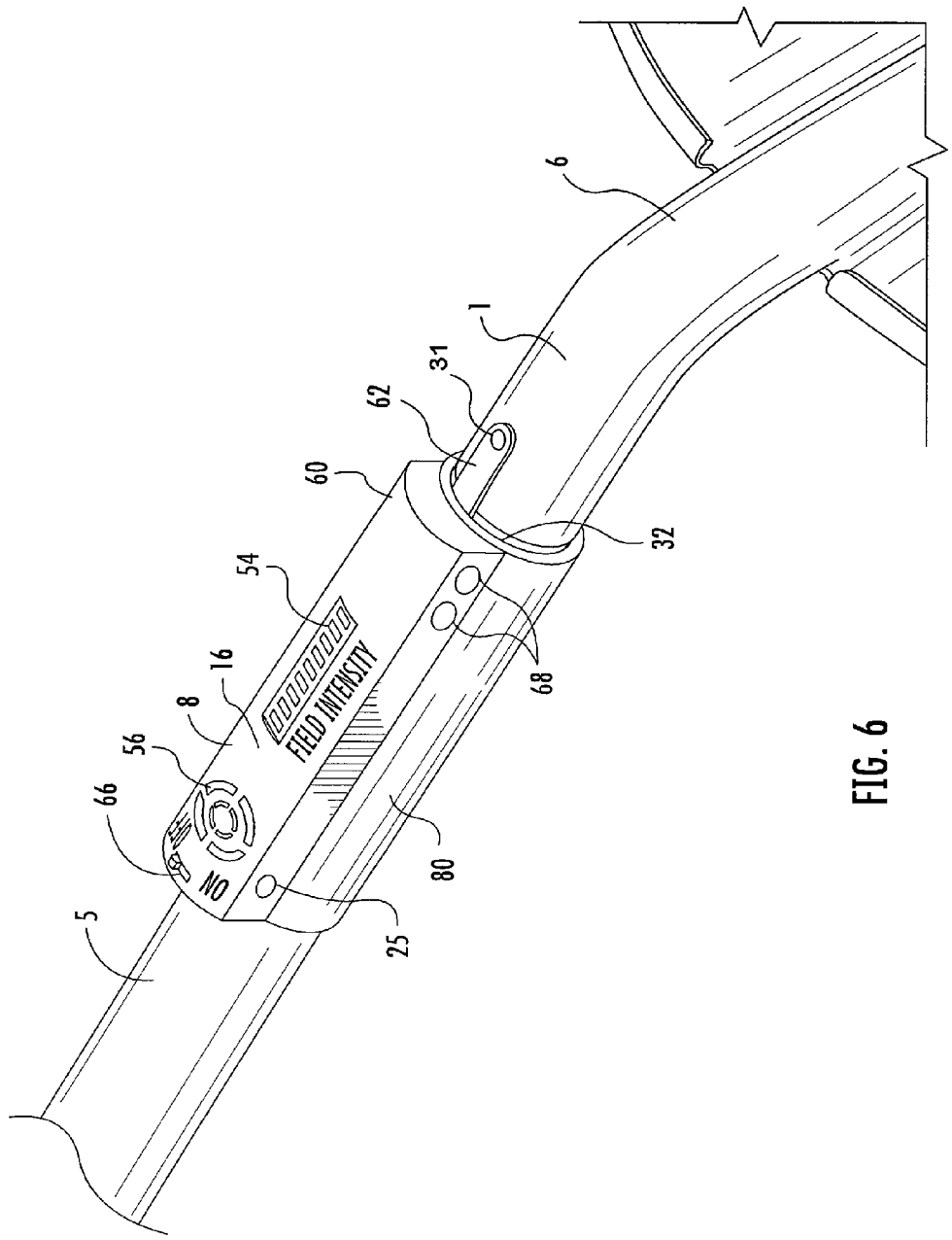
FIG. 6 is a partial perspective view of an alternative embodiment of the electrically active excavation apparatus of the present invention.

Referring to FIG. 6, an alternative embodiment of the present invention is illustrated. In this embodiment, the field detector system 8 is secured about the elongated handle 5 with a neoprene sleeve 80. The neoprene sleeve is elastic in construction to allow the FDS to be supplied as a kit or separate device constructed and arranged to be mounted upon the handle portion 5 of a pre-existing shovel or tool 1. In the preferred embodiment, the back side 32 is contoured to better fit the shape of the handle portion of the unitary device 2. The housing is also constructed and arranged to house a power supply in the form of batteries, and an alert mechanism that may be in the form of one or more lights 54 and/or an audible signal or tactile signal. The lights are preferably LEDs, while the audible is preferably a piezo or small speaker 56. Tactile feedback may be provided by a motor or solenoid arrangement. An electrically conductive plate 62 extends outwardly from the housing 60 while including apertures for connection to the electrically conductive blade portion 6. In operation, the FDS is electrically configured to produce a search field 19 about the electrically conductive portion 6, whereby the neutral to earth voltage gradient between the electrically conductive portion 6 and the ground 7, and the field detector system 8 determines if the neutral to earth voltage gradient 14 is greater than a preset value. If the neutral to earth voltage gradient 14 is greater than the preset value, then the field detector system 8 activates the visual and/or audible alert system 16. Whereby, the audible or visual alert gets incrementally stronger, lighting more LEDs or increasing volume or pitch of the audible signal and/or intensity of the tactile feedback, based on an increase on the preset value for the neutral to earth voltage gradient 14. When the neutral to earth voltage gradient 14 is below the preset value, the alert system is not triggered and remains silent. The field detector system 8 may also include a circuit breaker switch 25 to protect the field detector circuitry, and to reset the device in the event it receives an overvoltage. An on-off switch 66 may also be provided to extend the life of the battery circuit. In addition, a test circuit may be provided to allow the operator to touch a pair of contacts 68 to test for proper operation of the field detector prior to use of the tool. In operation, the operator would utilize one or two fingers to touch a pair of contacts 68 to indicate an electrical field to the field detector. This should cause the visual and/or audible and/or tactile alarms to operate indicating proper operation of the device. Proper operation would cause the LEDs to light and the audible signal to be emitted. In the event neither alarm signal is returned, the operator would know the device was non-functional for one of various reasons and thus it should not be relied upon to indicate proximity to a field.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A hand-operable excavation apparatus for detecting buried electrical cable comprising:
 a hand operable excavation apparatus in the form of a unitary device having a first end and a second end, said first end being a handle and said second end having an electrically conductive portion, said electrically conductive portion being constructed and arranged for breaking a ground material; and
 at least one electric field sensor, which is operable to sense a change in an electrical field within ground material, which is indicative of a buried cable, said electric field sensor in electrical communication with said electrically conductive portion;
 wherein said at least one electric field sensor senses the neutral to earth voltage gradient between said electrically conductive portion and a ground.

2. The hand-operable excavation apparatus of claim 1, wherein said electrically conductive portion is a metal blade.

3. The hand-operable excavation apparatus of claim 1, wherein said electrically conductive portion is constructed and arranged to lift ground material.

4. The hand-operable excavation apparatus of claim 3, wherein said electrically conductive portion is a shovel.

5. The hand-operable excavation apparatus of claim 1; wherein said electric field sensor is a voltage detector mounted on said unitary device.

6. The hand-operable excavation apparatus of claim 5, wherein said voltage detector comprises at least one alert system for indicating said voltage gradient to an operator of said hand operable excavation apparatus.

7. The hand-operable excavation apparatus of claim 6, wherein said voltage detector includes at least one sensor.

8. The hand-operable excavation apparatus of claim 7, wherein at least one sensor is electrically configured to produce a search field about said electrically conductive portion of said hand-operable excavation apparatus.

9. The hand-operable excavation apparatus of claim 8, wherein said at least one sensor senses the neutral to earth voltage gradient between said electrically conductive portion and ground, said voltage detector system comparing said neutral to earth voltage gradient to a preset value, said voltage detector system activating said at least one alert system if said neutral to earth voltage gradient is greater than said preset value.

10. The hand-operable excavation apparatus of claim 7, wherein said at least one alerting system is an audible alert.

11. The hand-operable excavation apparatus of claim 10, wherein said audible alert changes in intensity with respect to the value of said earth voltage gradient.

12. The hand-operable excavation apparatus of claim 7, wherein said at least one alerting system is a visual alert.

13. The hand-operable excavation apparatus of claim 12, wherein said visual alert changes in intensity with respect to the value of said earth voltage gradient.

14. The hand-operable excavation apparatus of claim 7, wherein said at least one alerting system is a tactile alert.

15. The hand-operable excavation apparatus of claim 14, wherein said tactile alert changes in intensity with respect to the value of said earth voltage gradient.

16. The hand-operable excavation apparatus of claim 1, wherein said at least one electric field sensor includes a circuit breaker for protection against electrical over voltage conditions.

17. The hand-operable excavation apparatus of claim 1, wherein said at least one electric field sensor is built integral to said hand-operable excavation apparatus.

18. The hand-operable excavation apparatus of claim 1, wherein said at least one electric field sensor is constructed and arranged for attachment to a pre-existing hand operable excavation instrument.

19. The hand-operable excavation apparatus of claim 18, wherein said at least one electric field sensor includes a contoured side, said contoured side being constructed and arranged for conjugate cooperation with said handle.

20. The hand-operable excavation apparatus of claim 1, wherein said at least one electric field sensor is battery operated.

* * * * *